Patented Nov. 3, 1936

2,059,259

UNITED STATES PATENT OFFICE 2,059,259

BLOWN DRYING OIL AND DERIVATIVES THEREOF

James Scott Long and George Loyal Ball, Jr., Bethlehem, Pa.; said Ball assignor of one-third to Archer-Daniels-Midland Company, a corporation of Delaware, and one-sixth to Lehigh University, a corporation of Pennsylvania No Drawing. Application May 27, 1932, Serial No. 614,036. Renewed January 23, 1935

10 Claims. (Cl. 134—79)

The natural drying oils, of which linseed oil is the most commonly used, constitute the principal ingredients of the great mass of protective films employed today. For many years, it has been common practice to subject these oils to various treatments, such as cooking, addition of driers, and blowing with air while hot in order to change their properties as by increasing the viscosity, and thereby decreasing the time required for drying.

In the blowing processes heretofore employed, it has been customary, at least during the early part of the process, to use relatively high temperatures, as in the order of about 200° F. or higher. This is due to the fact that at low temperatures, blowing can be conducted for many hours without any apparent result, whereas, if heat is used during the early stages, the operation is apparently greatly accelerated without any superficially apparent difference in the result. Accordingly, it has been customary to use high temperatures until thickening begins in the course of a few hours, after which the temperature is dropped somewhat, say to about 170° or even lower. Thus ordinarily in blowing operations a temperature range has been used in any one operation, or else the temperature was maintained relatively high throughout the operation. Oils treated in this manner have been widely used in the protective coating industry, having been sold at times under the name of blown oils, and at times simply under the name of bodied boiled oil. Ordinarily, in oils of the type which we have referred to, one of the primary requirements has been to maintain the solubility of the oil in the ordinary thinners used, such as turpentine or petroleum spirits.

This invention which relates to new methods of treating such oils and new products resulting therefrom, may be applied to a number of types of drying oil, but inasmuch as linseed oil is the one most largely employed, we use it for the purposes of example.

It is interesting to consider the type of reaction that may occur when an oil is blown with air while being more or less heated. When linseed oil is simply heated in the kettle, the reactions which take place are generally considered to be of a polymerization or association type, that is, to involve either direct chemical union by primary valence forces, or some sort of a laying together of two or more molecules involving secondary valence forces. Of course, various other reactions are also taking place and the process of gellation which ultimately occurs involves colloidal concepts, but some type of polymerization or association is the predominating reaction producing an increase in viscosity of the oil. In this treatment the percentage of oxygen in the oil increases only very slightly. Such a reaction may be diagrammatically illustrated as follows, and will be referred to as type I. The dotted lines indicate some type of attraction the exact characteristic of which is not known:

*Type I*

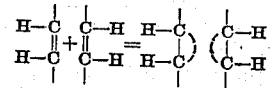

When oil is heat-bodied, its iodine number is lowered, indicating the presence of a smaller number of double bonds. However, if such a heat-bodied oil is exposed to the air it will oxidize and take up about the same percentage of oxygen as raw linseed oil. This indicates that the double bonds probably are not destroyed but are still available for oxidation and points to the fact that the major type of reaction occurring is one of an association in which the molecules are held together by secondary valence forces. Solvents which were solvents for the original single oil molecules continue to dissolve or disperse the larger aggregates. As the heat-bodying is continued, the degree of polymerization or association increases and the oil becomes less and less soluble or dispersible in mineral spirits or other types of usual oil solvents, and finally will set to a solid gel largely insoluble in mineral spirits, ethyl alcohol, or other organic solvents.

When oxygen reacts with linseed oil, a peroxide probably is formed which later may or may not rearrange to form alpha-hydroxy ketones. Such an oxidation and re-arrangement is illustrated below and will be referred to as Type II. This reaction has been discussed by Scheiber in Farbe & Lacke, page 63, (1930) and in the various papers of Morrell published in the Journal of Oil and Color Chemists' Association.

*Type II*

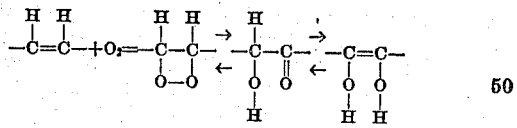

It is also possible that a combination of the two reactions of Type I and Type II may take place with the formation of oxygen bridges. This might occur in several ways, two of which are illustrated below as Types III and IV.

*Type III*

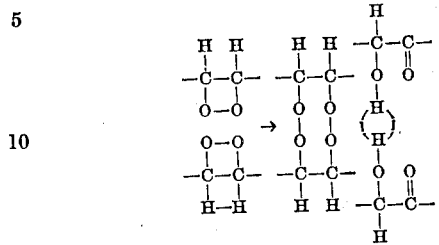

*Type IV*

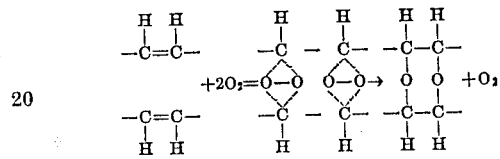

When the oil is simply being heat-bodied, reactions occurring are largely of Type I. The iodine number of the oil is reduced without any appreciable increase in the oxygen content, and unless the reaction is carried too far, remains completely soluble in mineral spirits.

When an oil is both heated and blown with air or other oxygen-containing gas, reactions of both Types I and II may take place. We know that this is true because the increase of oxygen content can be measured and because of the fact that we know that with temperatures even substantially below 212° F. a reduction in iodine number is being undergone. With the ordinary hot blown oil, blown to the point just short of gellation about the minimum iodine number that can be reached is of the order of 125 (Wijs method) and the maximum oxygen content will be about 18%. From the relatively high iodine number at the point just short of solidification, it is evident that in the ordinary hot blown oil some type of reaction is occurring which increases the viscosity at a faster rate per oxygen atom added than would be explained by the Type II reaction. This points either to the association type of reaction of Type I or to the formation of Type II products which are thereupon re-arranged as for example by the formation of oxygen bridges between the chains as in Types III and IV. The oxygen bridge reactions such as these have been discussed by Marcusson (Zeit angew. chem. 38, 148, 1925) and others. In these reactions the complexity of the molecules is greatly increased and the viscosity increases faster per oxygen atom than in the case of the Type II reaction.

We have discovered that by maintaining proper conditions, as for example by keeping the oil relatively cool while the blowing process continues, it is possible to keep the Type I, Type III and Type IV reactions to a minimum and obtain an oil largely the result of the Type II reaction, and have further found that this oil has very definite and marked characteristics which distinguish it from the oil which has undergone the usual processes heretofore employed which have involved reactions of Type I, Type III and Type IV. Among these characteristics are the fact that the iodine number (Wijs) can readily be reduced below 110 and the oxygen content to as high as 20% while the oil will still be a fluid at temperatures in the order of 165° F.

When the oil is blown cold there is very little, if any, Type I reaction occurring, as is evidenced by the fact that the number of molecules of oxygen added, as calculated from the increase in oxygen percentage, is substantially the same as the number of double bonds closed as calculated from the decrease in iodine number. The formation of Type III structures would of course account for this agreement between the increase in oxygen percentage and iodine number decrease, but the Type III structure does not seem possible because one of the outstanding characteristics of our cold blown oil is the fact that even when the blowing treatment has been continued to the point where the oil gels and becomes substantially solid at a temperature of about 100° F. it nevertheless can be melted to a clear readily flowing fluid at a temperature in the order of about 165° F. Of course, if the oil has not been blown to the point of immediate solidity, heating it to the higher temperature will produce at least an equal degree of fluidity even though there is no actual melting. This ease of producing fluidity indicates very strongly a simple molecular structure in which the molecules are not bound together by primary valences. Where the Type III or IV reaction occurs the molecules formed are complex with the resulting increase in the melting point, and with these complex molecules if the temperature is raised substantially in an attempt to melt the material, decomposition will occur instead of melting. The fact that the cold blown oil melts readily, even after being blown to solidity, indicates very strongly that the Type II reaction is the only one which is occurring to any substantial extent.

The high viscosity of our cold blown oil is accounted for by the fact that a very much larger number of the double bonds have been oxidized than in the case of the hot blown oil. Undoubtedly a certain amount of some sort of association between oxidized groups has also taken place, but this appears to be of a type which is easily broken, since if it were due to primary valence forces the solid oil probably would not melt easily.

It will be noted that if an oil has undergone the Type II reaction it will contain a relatively large number of free hydroxy or ketoxy groups. The development of these groups apparently changes the solubility of the oil, for it loses its solubility in the solvents which do not themselves have such groups, but increases its solubility in certain solvents of the types containing such groups. Thus ordinary linseed oil is recognized to be readily soluble in solvents such as turpentine, carbon tetrachloride, petroleum spirits and similar bi-elemental solvents, but is practically insoluble in certain of the solvents such as are ordinarily used in making lacquers, as for example ethyl alcohol.

We have found that when linseed oil is blown cold there will be a gradual diminution of its solubility in the usual linseed oil solvents, and ultimately an increase in the solubility in ethyl alcohol. Thus ordinary raw linseed oil is substantially completely soluble in any proportion in the linseed oil solvents such as turpentine or petroleum spirits and is substantially insoluble in alcohol. When the oil is blown cold the alcohol solubility can readily be brought up to the point where the oil will dissolve at least its own weight of ethyl alcohol, and its solubility in the linseed oil solvents will be reduced to the point where it will not dissolve substantially more than its own weight of such solvent. As a matter of fact, when the oil has been cold blown to the point of solidity it probably takes up these linseed oil solvents by adsorption and swelling rather than by true solution. In the case of the hot blown oil, the solubility in the usual linseed oil solvents remains very high right up to the point where the oil begins to solidify and after it is thus solidified, it is substantially insoluble in any of the usual solvents.

We recognize that in the case of the hot blown oil, the Type II reaction does occur to some extent and therefore, as would naturally be the case, there is some increase in solubility in alcohol, but even if the oil is blown at temperatures as low as 165° F. the material will be insoluble in alcohol when blown through to solidity. On the other hand, if the oil is blown relatively cold the solubility in alcohol increases steadily, and it is readily possible to produce a product which will dissolve 60% or more of ethyl alcohol.

As above indicated, one of the essential features of our method of making our product as now practised is in the low temperature treatment of of the oil. Theoretically the lower temperature used, the more complete would be the elimination of Type I, III and IV reactions, but if the temperature is too low, the Type II reaction is slowed up to the point where the process becomes non-commercial. We have found that the lowest temperature at which the process can be conducted on any commercial basis is about 50° F. but we do not wish to limit ourselves to this minimum temperature, as it may be possible to produce similar results in a shorter time by the development of an appropriate oxidation catalyst. In this connection we may point out that the use of the ordinary driers, such as metallic linoleates and metallic resinates, somewhat modify the blowing reactions but preferably are avoided as they appear to induce association even more rapidly than they do oxidation. The top limit of temperature which may be safely employed for any continued time appears to be about 160° F. to 165° F., depending on various factors, including the degree of unsaturation of the oil treated. Oil blown at a temperature approaching this top limit to the point where it readily gels may be on the border line, and we prefer not to exceed temperatures somewhat lower than that stated, say, for example, 155° F. or 150° F. A good working range of temperature which we have found operative is between 100° F. and 140° F.

At these temperatures the time of treatment is necessarily a long one. Whereas ordinary commercial blown oil is treated for about four to twenty-four hours, our process takes in the order of from about 200 hours to about 300 hours or more at a temperature of 100° F. It is recognized that there is a substantial variation even in different samples of one kind of oil and of course as between different kinds of drying oils there may be an even greater variation, so that these figures are given as indicative of what we mean when we say a slow treatment, but in any event our process will ordinarily take more than 100 hours. Ordinarily the process will be controlled more by the end point than by the time. This end point lies within the range of where the oil will form a solid gel on standing, either immediately upon cooling to room temperature, or after several weeks but not beyond the point where the oil will be fluid at a temperature of about 160° F. when the treatment is first finished. This means that if the temperature used is at or near the upper limits (below 165° F.) the treatment should be stopped while the oil is still fluid, whereas, at lower temperatures, say around 100° F., the treatment may be continued until the oil is a solid gel at the temperature of treatment. Ordinarily the end point demands that the oil be treated until it has reached a viscosity of at least 1 minute at 75° F. on the Gardner-Holdt scale and it is better to carry it on even further, say to a viscosity of at least about 2 minutes or higher.

As shown by the foregoing discussion, when oil is blown according to our process, the primary effect is one of oxidation, and the association reactions are maintained at a minimum. We find, however, that this process does initiate association reactions and that these will continue slowly after the blowing treatment has stopped until a solid gel is formed which ultimately will become largely insoluble. This is exceedingly advantageous from one point of view, for it results in the formation in the final film of a hard, dense mass due to the re-arrangement of the molecules with relatively little further oxidation, but would by itself render the use of our material difficult. However, we have found that this tendency of the molecules to re-arrange and associate can be substantially inhibited, for until such association has taken place, the oil not only can be melted, but is also readily soluble, as distinguished from the ordinary blown oil which is either permanently liquid and soluble in certain solvents or solid and substantially insoluble.

As pointed out above, our product has acquired new or changed solubilities as compared to the original oil, and we have found that an advantageous way of inhibiting aggregation is by adding to the blown oil a polar organic solvent, that is, an organic solvent comprising at least three elements which ordinarily will include carbon, hydrogen and oxygen, which we term a polyelemental organic solvent as distinguished from the bielemental solvents such as the hydrocarbons and carbon tetrachloride. The art recognizes a general class of materials known as organic solvents, and of these we find it satisfactory to use for this purpose any of the polyelemental organic solvents of the type which are adapted to be incorporated in a lacquer.

The great bulk of the polyelemental solvents used are alcohols or esters which can be generically grouped as substances of the formula $C_nH_{2n+1}R$, in which $n$ ordinarily will not exceed the value of 6 and in which R represents either a hydroxy group or an organic acid radical. The organic acids most frequently employed are the fatty acids having not more than three carbon atoms, though somewhat higher acids may be used where their odor is not objectionable, and non-fatty acids such as phthalic and lactic may be employed in the formation of the ester. In addition to the alcohols and esters, ketones (principally acetone), and also ethers are frequently employed. All of the above are oxygen containing polyelemental organic solvents, but we wish it to be understood that we do not intend to exclude the use of any other solvent that may be found having groups with a proper affinity for the hydroxy or ketoxy groups of the oxidized oil. In any event, as far as we have been able to ascertain, any of the polyelemental solvents that are now used in the formulation of cellulose ester lacquers, will act in a similar way as a solvent of our oxidized oil and will serve as an inhibitor of further association reactions, whereas, the bielemental substances may serve as solvents but not as inhibitors. Thus, if a sample of our oil is blown to a 4-minute viscosity and dissolved in less than an equal quantity of xylene, it will be found after some time that a gel has formed through the solvent, which will not be the case if alcohol alone, or a mixture of alcohol and xylene, is employed.

The amount of solvent material to be added will vary somewhat with its nature and the size of its molecules, and even outside of these considerations may be varied over wide limits, but may be illustrated by the fact that we have obtained excellent results by adding to the oil, immediately after blowing, about 15% of denatured ethyl alcohol. It is our belief (though we do not wish to be limited to this theory) that the polar molecules of the solvent have some affinity for the polar groupings of the oil and tend to exhaust the energy of the oil so that further association of the oil particles will be inhibited. However, when this solvent is later evaporated off in the use of our material, the tendency of the oil particles to associate will again be brought into play, with the result that dense coherent films will be formed, which will eventually lose their solubility in alcohol. While ordinarily we prefer to use the solvents at the end of the blowing operation, they may be added while the blowing is going on. If desired, bielemental solvents may be mixed with them, or in some cases a bielemental solvent such as xylene may be added during blowing and a polar solvent added later.

Oil made according to our process may be found to have many uses, but one particular benefit which results from changing the solubility of linseed oil is that this change makes it possible to combine the modified linseed oil of our invention with cellulose esters in almost any desired proportion.

The product of our invention apparently dissolves nitrocellulose directly by simple mixing, and combinations of the oil and cellulose esters in suitable solvents are entirely compatible in all proportions. If, after the composite solution is formed, the solvents are removed as completely as possible, even by forced drying, the resulting film comprising the cold blown oil and cellulose ester remains clear and is extremely tough and elastic, indicating the complete compatibility of the cellulose ester with the cold blown oil. In fact, the indications are such as to lead us to believe that there may be a chemical combination between the blown oil and the cellulose ester. Thus even if the oil constitutes a high percentage of the film forming ingredients, such as from 50% to 90%, there is no syneresis or sweating out of the oil from the film. The stability of our product, as indicated by the fact that driers do not influence it, is particularly valuable in this combination, as changes in the oil ingredient would tend to induce checking or cracking.

We recognize that attempts have heretofore been made to combine blown linseed oil with cellulose esters, but heretofore the amount of linseed oil that could be used was relatively small and there was a tendency of the solvent being used in a second coat to attack an undercoat. This is not true with the mixtures made using the oil of our invention. Liberal second coats containing good solvents applied to films ranging in age from freshly dried to one month old did not cause swelling or lifting of the first coat.

The combination of our treated oil with the cellulose ester permits us to do away with the use of both resins and plasticizing agents, for if the oil has been brought up to an adequate viscosity it combines the two and apparently inconsistent functions of both increasing the hardness of the cellulose film and also its elasticity. However, resins may be included if desired.

The relative proportions of our blown oil which will be used with the cellulose ester may vary within wide limits; for example, some effect is found if as little blown oil is used as corresponds to 10% of the film forming ingredients, and this may be increased to a greater proportion, though if more than 75% of oil is included the film shows some tendency to remain tacky.

A further feature of importance in connection with our treated oil is that it has a low acid value permitting it to be combined with basic pigments, and due to the large amount of oil that may be used, films of adequate thickness can be formed from esters of greater viscosity than the low viscosity esters which are now generally employed in making lacquers.

In addition to its use in combination with cellulose esters, our blown oil can be advantageously used as a film forming material by combining it with resins such for example as the synthetic phenol-formaldehyde varnish resins now on the market. In this case the oil while in a fluid state is heated with the resin so that the two are fully fluxed together, or if the resin is soluble as in the case of the glyptal resins, it may be dissolved and mixed with the oil solution.

We have further found that our controlled blowing operation may be used as a means for causing combinations to take place between the oil and other bodies. It is known that substances in a so-called nascent state are very reactive. Apparently at the time the double bonds of the unsaturated glycerides are broken by the addition of oxygen, a substantially nascent condition is found, and by having present polar bodies which can react with the oxidized oil molecules or certain oxygen-containing groups of these molecules, conditions are favorable to have these other substances react with such groups as they form, so that new compounds can be made; and the presence of such bodies may also serve to prevent or retard re-arrangements or reactions which would otherwise normally take place. Types of substances which may be included in the oil during the blowing operation are fatty acids, especially unsaturated acids having 18 to 24 carbon atoms, alcohols, aldehydes, ketones, esters, for example methyl linoleate, ethylene chlorhydrin, and other polar bodies either aliphatic or aromatic. Substances of this type may be mixed with the oil before the modified blowing operation is started or added at later stages, and by their combination with the oil a great variety of products can be obtained.

For the purposes of illustration, some examples are given showing methods in which our invention can be utilized.

*Example No. 1.*—As an illustration of our procedure, a good grade of refined linseed oil was blown for nearly 300 hours at a temperature of about 127° F. The resulting oil was lighter in color than the starting material but very thick and viscous. Many batches solidified to gel on cooling. 50 parts by weight of this oil or gel was cut immediately after blowing with 50 parts by weight of a 50-50 alcohol-xylol mixture and then mixed with 50 parts by weight of low viscosity nitro-cellulose thinned with a suitable volume of ethyl acetate and other usual lacquer solvents including some high boiling ones. The resulting product was readily applied with a brush; it was dust free in 15 minutes and dried hard in an hour. On test the film showed an elongation of about 70% as against 15 to 20% for the usual cellulose ester film. Another sample of this material was applied to metal and baked. It showed good adherence to the metal and only very slight loss in elongation on baking.

Example No. 2.—Like results were obtained by dissolving old cellulose acetate photographic film and combining the solution with cut linseed oil blown as described in connection with the first example.

Example No. 3.—Alkali refined varnish oil was blown for 200 hours at about 130° F. and then approximately 100 hours at about 113° F. It became extremely viscous and solidified to a solid gel which was very rubbery and elastic and very light in color, but melted to a clear fluid at a temperature of 150° F.

Example No. 4.—A refined linseed oil was blown at a temperature of 120° F. with as large a volume of air as possible until the product had a viscosity of about 20 minutes in the Gardner-Holt standard viscosity tubes at 75° F. About 15% of ethyl alcohol was then added at once and the mixture agitated until a uniform clear solution was obtained. The oil had an iodine number of about 100 (Wijs) and contained about 22% oxygen. About 300 hours was required to complete the blowing. The color was extremely light.

Example No. 5.—An alkali refined linseed oil was blown for approximately 100 hours at a temperature of 140° F. with as large a volume of air as possible. The temperature was then dropped to 100° F. and the blowing continued until the oil solidified. About 15% of ethyl alcohol was then added at once and the mixture agitated until a uniform solution was obtained. The oil had an iodine number of about 100 and contained about 23% of oxygen. The color was extremely light.

Example No. 6.—Linseed oil was blown with air at a temperature of about 100° F. until the viscosity had increased to about 2 minutes in the Gardner-Holdt viscosity tubes at 75° F. It was then immediately dissolved in about 15% of ethyl alcohol and agitated until a uniform solution was obtained. The product was very light colored and the iodine number was about 105. The oxygen content was about 21%. If the oil is allowed to stand without adding the alcohol it gradually forms a solid gel which remains fusible for a while and can be melted at about 150° F. and dissolved in ethyl alcohol. After a few weeks it forms an insoluble and infusible gel (undissolved).

Example No. 7.—Linseed oil was blown with air at a temperature of about 120° F. until the iodine number had been reduced to 120. As large a volume of air as was possible dispersed as tiny bubbles was used. The oil was then immediately dissolved in about 15% of ethyl alcohol. It had a very light color.

Example No. 8.—Sample formulas for preparing coating compositions from our product are as follows:

| | |
|---|---|
| A Nitrocellulose | 100 |
| Oil | 150 |
| Solvent (approximately) | 500 |
| B Nitrocellulose | 100 |
| Oil | 100 |
| Solvent (approximately) | 500 |
| C Nitrocellulose | 100 |
| Oil | 75 |
| Solvent (approximately) | 500 |

The solvent used in these formulas may be a mixture of the following composition

| | Percent |
|---|---|
| Butyl acetate | 15 |
| Butanol | 15 |
| Ethyl acetate | 10 |
| Denatured alcohol | 10 |
| Toluol | 50 |

If enamels or paints are to be made up with our product as a vehicle, the pigments are merely ground in by known means, such as buhrstone or pebble mills. If the ratio of pigment to oil is too great, or if the body of the oil is too high, some solvent or thinner may be added. In the latter case, it may be desirable to use closed mills to avoid evaporation. Likewise, in some cases the pigments may be ground in the entire vehicle formula (with or without all the thinner) in closed mills. It will, of course, be understood that other methods familiar in the art may be used for incorporation of the pigments. The above methods are merely given as examples.

When panels prepared from the coating compositions described in Example 8 were exposed to the ultra-violet light from a mercury arc lamp, the film retained its splendid gloss unimpaired and retained its flexibility and toughness but nevertheless showed that some change had occurred as the film had become substantially impervious to solvents. Thus ultra-violet light which tends to injure most films appears in at least one particular to improve the film of our product. Similar films made in colors or in white also retained their gloss unimpaired and suffered only a very slight darkening in color. This indicates that these films containing high percentages of our product with suitable pigments will be very serviceable in outdoor exposures where they are subjected to ultra-violet light. Our product enables the lacquer manufacturers to use large quantities of oil without resin or plasticizer and still obtain fast drying and excellent rubbing and polishing qualities and unequalled lustre, elasticity and toughnes. At the same time there is no tendency of the oil to shrink or to sweat out of the film or to lift on re-coating.

We expect, therefore, that our product will find use in nitrocellulose coating compositions used as beautifying and protective coatings on furniture, automobile tops, bodies and tire covers, woodwork of houses both inside and out, railway cars, metal railway coaches, both inside and out, structural steel bridges and other metals, ships, fabrics, linoleum, paper and many other places, and that in general this new type of oil will greatly extend the use and usefulness of cellulose esters. We feel that the combination of many advantages such as extreme flexibility and toughness, light color, great resistance to water and mild alkalies, high gloss, which is retained after exposure to ultraviolet light and good leveling qualities on application will insure the use of these blown oil-cellulose ester combinations where ordinary acquer is not suitable at present.

We have referred specifically to blown linseed oil. We have also blown or oxidized under substantially the same conditions, fish oils, perilla oil, soya bean oil and tung oil, and our process is applicable to other natural drying and semi-drying oils, and also mixtures of the oils and mixtures of the oils and free fatty acids.

We have also made by methods of organic synthesis the mannitol, pentaerythritol esters and other esters of the various unsaturated 18 to 24 carbon fatty acids and mixtures of these, and oxidized them under the same conditions as used for the linseed oil; namely, simple blowing with oxygen containing gases at temperatures between 50° F. to 160° F. The products naturally vary in properties and therefore usefulness, but we wish to have it understood that these also are very useful as ingredients of protective coatings and we also claim these various materials and mixtures of them and include them under the phrase "drying oils."

In the foregoing specification, we have referred to the act of causing the oxygen containing gas to contact with the oil as "blowing" as this is the method usually employed in the art; but we wish it to be understood that other methods of causing such contact, as by using spraying or scrubbing apparatus, may be employed as equivalents.

This application is a continuation in part of our earlier application, Ser. No. 565,194, filed Sept. 25, 1931.

What we claim is:

1. As a new product, an oxidized drying oil produced by low temperature blowing, characterized by the fact that it contains at least 20% of oxygen and has a viscosity at 75° F. of at least 1 minute on the Gardner and Holt scale but is a readily flowing liquid at 165° F. and is soluble in ethyl alcohol.

2. As a new product, an oxidized drying oil produced by blowing under conditions adapted to minimize intermolecular association of the oil, which product is characterized by the fact that it is adapted to form a solid practically insoluble gel on standing at normal temperatures but is soluble in ethyl alcohol immediately after such blowing operation.

3. As a new product, a solution of an oxidized drying oil in a solvent, in which product the solute comprises an oxidized drying oil produced by blowing under conditions adapted to minimize intermolecular association and which is characterized by the fact that it is soluble in ethyl alcohol immediately after such blowing operation but is adapted to form a solid, practically insoluble gel on standing at normal temperatures when substantially free from solvent, and in which product the solvent comprises a polyelemental organic solvent of a type adapted to prevent such gellation.

4. As a new product, a compatible solution comprising a cellulose ester and a blown drying oil produced by low temperature blowing, which blown drying oil is soluble in ethyl alcohol and is adapted, when undissolved, to form a solid gel if allowed to stand at normal temperatures.

5. A lacquer in which from 10% to 75% of the solid film forming material, other than pigment, is a blown drying oil which is soluble in ethyl alcohol but is adapted to form a solid gel if allowed to stand alone at normal temperatures, and in which from 25% to 90% of such film forming material is nitrocellulose.

6. The process of producing an oxidized drying oil which comprises contacting such an oil with an oxygen containing gas while maintaining a relatively low temperature substantially within the range between 50° F. and 160° F., continuing such treatment until a product is obtained which is soluble in ethyl alcohol but is adapted when undissolved to form a gel at normal temperatures.

7. The process of producing a film forming material comprising an oxidized drying oil which comprises the steps of contacting such an oil with an oxygen containing gas while maintaining a relatively low temperature substantially within the range between 50° F. and 160° F., continuing such treatment until a product is obtained which is soluble in ethyl alcohol but which on standing will change over to a largely insoluble gel and prior to such change dissolving such oxidized oil in a polyelmental solvent adapted to prevent such change.

8. The process of forming protective coating films which comprises the steps of blowing a drying oil for a long period at low temperatures until a product is obtained which has a viscosity of at least 1 minute on the Gardner and Holt scale but is soluble in ethyl alcohol, dissolving such product in a solvent adapted to deter further association reactions, forming a protective coating composition comprising such solution, forming a film of such composition and permitting the solvent to evaporate.

9. A process as defined in claim 8, in which the oil product is combined with nitrocellulose to form the protective coating composition.

10. A process as defined in claim 8, in which the oil product is combined with a resin to form the protective coating composition.

JAMES SCOTT LONG.
GEORGE LOYAL BALL, JR.